US010510041B2

(12) United States Patent
Jones et al.

(10) Patent No.: US 10,510,041 B2
(45) Date of Patent: Dec. 17, 2019

(54) SYSTEMS AND METHODS FOR MONITORING FEATURED PRODUCT INVENTORY

(71) Applicant: Walmart Apollo, LLC, Bentonville, AR (US)

(72) Inventors: Matthew A. Jones, Bentonville, AR (US); Nicholaus A. Jones, Fayetteville, AR (US); Robert J. Taylor, Rogers, AR (US); Aaron J. Vasgaard, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 159 days.

(21) Appl. No.: 15/397,918

(22) Filed: Jan. 4, 2017

(65) Prior Publication Data

US 2017/0193438 A1    Jul. 6, 2017

Related U.S. Application Data

(60) Provisional application No. 62/275,567, filed on Jan. 6, 2016.

(51) Int. Cl.
*G06Q 10/08* (2012.01)
*G06K 7/10* (2006.01)
(Continued)

(52) U.S. Cl.
CPC ....... *G06Q 10/087* (2013.01); *G06K 7/10366* (2013.01); *G06K 7/1413* (2013.01);
(Continued)

(58) Field of Classification Search
CPC ............ G06Q 10/087; G06K 7/10366; G06K 7/1413; G06K 17/0022; G08B 13/2417; G08B 13/2462; G08B 13/248
(Continued)

(56) References Cited

U.S. PATENT DOCUMENTS

| 7,240,027 B2 | 7/2007 | McConnell |
| 7,480,623 B1 | 1/2009 | Landvater |

(Continued)

OTHER PUBLICATIONS

"Warehousing and Storage", http://help.sap.com/SCENARIOS_BUS2012/helpdata/EN/2e/4dea53653c115be10000000a174cb4/content.htm, 2015, 5 pgs.

*Primary Examiner* — Florian M Zeender
*Assistant Examiner* — Nicole Elena Bruner
(74) *Attorney, Agent, or Firm* — Fitch, Even, Tabin & Flannery LLP

(57) ABSTRACT

In some embodiments, methods and systems of monitoring featured product displays at retail sales facilities are described. For one or more products received at a retail sales facility and designated as a product for a featured product display at the retail sales facility, a predetermined time interval is set from a delivery time of the one or more products to the retail sales facility to a time for generating an indication that the one or more products has been set on the featured product display at the retail sales facility. Then after the expiration of the predetermined time interval, electronic data is generated indicating that the one or more products delivered to the retail sales facility has been set on the featured product display at the retail sales facility.

7 Claims, 3 Drawing Sheets

(51) Int. Cl.
*G06K 7/14* (2006.01)
*G06K 17/00* (2006.01)
*G06Q 30/02* (2012.01)
*G08B 13/24* (2006.01)

(52) U.S. Cl.
CPC ..... *G06K 17/0022* (2013.01); *G06Q 30/0251* (2013.01); *G08B 13/248* (2013.01)

(58) Field of Classification Search
USPC .......................................................... 705/28
See application file for complete search history.

(56) References Cited

U.S. PATENT DOCUMENTS

| | | | |
|---|---|---|---|
| 7,894,932 B2 | 2/2011 | Mountz | |
| 7,896,244 B2 | 3/2011 | McCormick | |
| 8,131,397 B2 | 3/2012 | Vahlberg | |
| 8,321,302 B2 * | 11/2012 | Bauer | G06K 7/0008 705/28 |
| 8,321,303 B1 * | 11/2012 | Krishnamurthy | 705/28 |
| 2001/0042024 A1 * | 11/2001 | Rogers | G06Q 10/0637 705/26.81 |
| 2007/0203809 A1 | 8/2007 | Bapat | |
| 2008/0052205 A1 * | 2/2008 | Dolley | G06Q 10/06 705/28 |
| 2009/0101712 A1 * | 4/2009 | Ulrich | G06Q 10/087 235/383 |
| 2012/0166241 A1 * | 6/2012 | Livingston | G06Q 10/0631 705/7.12 |
| 2014/0006131 A1 * | 1/2014 | Causey | G06Q 10/0875 705/14.24 |
| 2014/0100769 A1 | 4/2014 | Wurman | |
| 2014/0129329 A1 * | 5/2014 | Sekine | G06Q 30/0251 705/14.53 |
| 2015/0006336 A1 * | 1/2015 | Vasantham | G06Q 10/087 705/28 |

* cited by examiner

SYSTEMS AND METHODS FOR MONITORING FEATURED PRODUCT INVENTORY

RELATED APPLICATIONS

This application claims the benefit of U.S. Provisional Application No. 62/275,567, filed Jan. 6, 2016, which is incorporated herein by reference in its entirety.

TECHNICAL FIELD

This disclosure relates generally to managing inventory at retail sales facilities and, in particular, to systems and methods for monitoring feature product inventory at retail sales facilities.

BACKGROUND

Retail sales facilities such as large department stores often offer products for sale to consumers on featured product displays designed to attract consumers' attention to the products. Products may be set on featured product displays for example, based on seasonal considerations (winter/spring/summer/fall), holiday considerations (e.g., Christmas, Thanksgiving, Halloween, or the like), or product-specific considerations (e.g., new product, clearance product, or the like). Retail sales facilities may set their inventory management systems to update the inventory management databases to indicate that the featured products are set on the featured product displays by the workers based on a date scheduled for the start of the featured product displays. Such updates are made on an assumption that the featured products are set on the featured product display by the workers at the retail sales facility prior to the scheduled start date of the featured product display.

A problem with such updates of the inventory management databases based on the product feature scheduled start time is that products are not always timely set by the workers on the featured product display prior to the start date of the featured product display. For example, the product may not be timely delivered to the retail sales facility, or the workers may not timely pick the feature-designated products from bins in the stock room to work the products to the featured product display. Also, the workers do not always enter every task they perform at the retail sales facility into their electronic device, often leading to situations where certain worker tasks and inventory of certain products at the retail sales facility are not always properly recorded in the inventory management database.

A result of the above shortcomings of conventional feature product updating methods is that some products may be indicated as being set on featured product displays, but may be either in bins at the stock room of the retail sales facility, or may not be in stock at the retail sales facility. This may lead to undesired loss of sale situations where a consumer attempts to purchase a product expected to be on the featured product display on the sales floor, but the product is not present on the featured product display. In addition, products that are sold to consumers but not indicated in the system as being set on featured product display may be interpreted by the inventory management system as being in high demand, leading the inventory management system to reorder a disproportionally high quantity of the product without accounting for the fact that the product was in high demand and sold fast because it was offered to the consumers on the visually attractive and easily accessible featured product display. The above situations may undesirably lead to understocking and/or overstocking of products at the retail sales facility.

When workers at the retail sales facility perform the task of placing featured products onto a featured product display so that the product (i.e., a new book, movie, or game) is offered to the consumers as a more visible feature product for a certain target selling period of time, the workers is typically asked to confirm compliance by manually entering data confirming this worker task into their portable electronic device. Then, after the feature selling period, the workers are tasked with removing the featured products and confirm the removal via another manual entry into their portable electronic device. Such activities take up time that the workers may be devoting to other useful tasks, such as assisting customers. Further, a large volume of manual data entry by the workers increases the risk of human error in the data entry, sometimes undesirably leading to misplaced or unaccounted for products at the retail sales facility, and requiring additional quality assurance procedures to double check the accuracy of the data entered by the workers, which undesirably increase operational costs.

BRIEF DESCRIPTION OF THE DRAWINGS

Disclosed herein are embodiments of systems, devices, and methods pertaining to methods and systems for monitoring feature product inventory at a retail sales facility. This description includes drawings, wherein.

Figure 1:
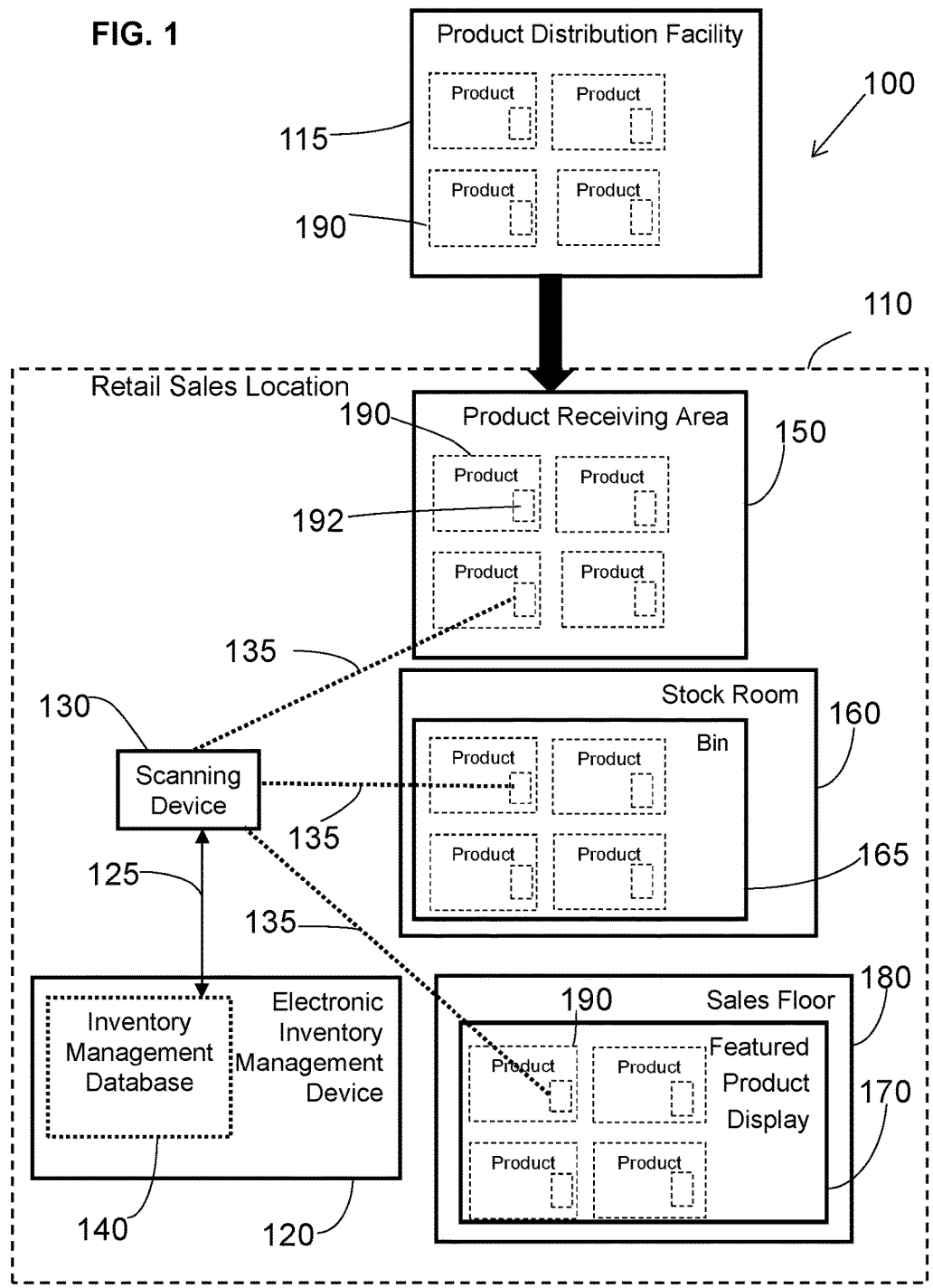
FIG. 1 is a diagram of a system for monitoring feature product inventory at a retail sales facility in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally, the systems, devices, and methods described herein provide for the monitoring of featured product displays at retail sales facilities. In some embodiments, for so-called "feature" products received at a retail sales facility, a predetermined time interval is set from a time when the "feature" products are received at the retail sales facility to a time for generating electronic data indicating that the "feature" products have been set on the featured product display at the retail sales facility. Then, after the expiration of the predetermined time interval, electronic data is generated indicating that the "feature" products received at the retail sales facility have been set on the featured product display.

In one embodiment, a method of monitoring featured product displays at retail sales facilities includes: receiving at least one product at a retail sales facility, the at least one product being designated as a product for a featured product display at the retail sales facility; setting, using an electronic inventory management device, a predetermined time interval from a time the at least one product was received at the retail sales facility to a time for generating an indication that the at least one product has been set on the featured product display at the retail sales facility; and generating, using the electronic inventory management device and after an expiration of the predetermined time interval, electronic data indicating that the at least one product received at the retail sales facility has been set on the featured product display at the retail sales facility.

In another embodiment, a system for monitoring featured product displays at retail sales facilities includes, an electronic inventory management device including a processor-based control unit configured to: record receipt of at least one product at a retail sales facility, the at least one product being designated as a product for a featured product display; set a predetermined time interval from a time of receipt of the at least one product at the retail sales facility to a time for generating an indication that the at least one product has been set on the featured product display at the retail sales facility; and generate, after an expiration of the predetermined time interval, electronic data indicating that the at least one product received at the retail sales facility has been set on the featured product display at the retail sales facility.

In another embodiment, a system for monitoring featured product displays at retail sales facilities includes: means for recording receipt of at least one product at a retail sales facility, the at least one product being designated as a product for a featured product display; means for setting a predetermined time interval from a time of receipt of the at least one product at the retail sales facility to a time for generating an indication that the at least one product has been set on the featured product display at the retail sales facility; and means for generating, after an expiration of the predetermined time interval, electronic data indicating that the at least one product received at the retail sales facility has been set on the featured product display at the retail sales facility.

FIG. 1 shows an embodiment of a system 100 for monitoring featured product inventory at a retail sales facility 110. The retail sales facility 110 may be any place of business (e.g., a brick-and-mortar store) where products 190 are stocked and sold to consumers. The term "featured product" refers to products 190 designated as products to be offered for sale to consumers on a featured product display instead of a regular shelf in an aisle on a sales floor. Such featured products 190 may include, for example, products 190 recently received at the retail sales facility 110 and still in a product receiving area 150, "overstock" products 190 stored in a stock room 160 (e.g., in a bin 165) of a retail sales facility 110, and products 190 on one or more featured product displays 170 on a sales floor 180 of the retail sales facility 110. The products 190 may be delivered to the retail sales facility 110 from a product distribution facility 115, which may be a regional distribution center associated with the retail sales facility 110 or a product manufacturer's facility.

The exemplary system 100 in FIG. 1 includes an electronic inventory management device 120 configured generally to manage the inventory of products 190 at the retail sales facility 110. More specifically, the electronic inventory management device 120 is configured to store and manage electronic data associated with the products 190 at the retail sales facility 110, as well as tasks performed by a worker or workers with respect to the products 190 at the retail sales facility 110. The electronic inventory management device 120 in FIG. 1 may be a stationary or portable electronic device, for example, a desktop computer, a laptop computer, a tablet, a mobile phone, or any other electronic device including a processor-based control circuit (i.e., control unit) and configured for data entry and one-way and/or two-way communication (e.g., via communication channel 125) with another device located at the retail sales facility 110 (e.g., scanning device 130), or with another device at a location remote to the retail sales facility 110 (e.g., a server at the product distribution facility 115 that is configured for two-way communication with the electronic inventory management device 120 at the retail sales facility 110).

With reference to FIG. 1, the exemplary electronic inventory management device 120 includes an inventory management database 140 configured to store electronic information associated with the products 190 at the retail sales facility 110 and associated with the worker tasks performed or scheduled to be performed by the workers with respect to the products 190. In some embodiments, the inventory management database 140 may store electronic data including but not limited to: identification of products 190 designated as featured products at the retail sales facility 110; indication of scheduled featured product display start date; indication of scheduled featured product display end date; indication of which featured products 190 are to be placed together on a featured product display 170; time stamp of receipt of a featured product 190 in the product receiving area 150 of the retail sales facility 110; and indication of a worker task taken by a worker with respect to the featured product 190. The inventory management database 140 may be stored, for example, on non-volatile storage media (e.g., a hard drive, flash drive, or removable optical disk) internal or external relative to the electronic inventory management device 120, or internal or external to computing devices separate from the electronic inventory management device 120.

The above-described exemplary electronic data and other electronic data associated with the products 190 and worker tasks at the retail sales facility 110 may be recorded in the inventory management database 140, for example, as a result of a task performed by a worker at a retail sales facility 110 with respect to the products 190. For example, the worker may enter a worker task into the scanning device 130 indicating that the products 190 have been received at the retail sales facility 110 and are being unloaded from a delivery truck. Also, the worker may scan a product 190 using the scanning device 130 when unloading the product 190 from the cargo space of the delivery truck in the product receiving area 150, when binning the product 190 into a bin 165 in the stock room 160, when picking the product 190 from the bin 165 in the stock room 160, and/or when setting the product 190 onto a featured product display 170 on the sales floor 180. In some embodiments, at least some of the electronic data stored in the inventory management database 140 may be transmitted to the electronic inventory management device 120 from a remote server, for example, a server located at the product distribution facility 115 or a server located at a regional center associated with the retail sales facility 110. For example, electronic data reflecting the storage requirements, expiration date, featured product display start date, or other factors associated with the product 190 may be received by the electronic inventory management device 120 from a server located at a product distribution or a regional data center.

In the embodiment shown in FIG. 1, the system 100 includes a scanning device 130 in two-way communication with the electronic inventory management device 120 over a communication channel 125 (which may be a wired or wireless channel). The scanning device 130 may be an electronic (e.g., hand-held) scanner that may be used by a worker at the retail sales facility 110. Examples of such scanning devices 130 may include, but are not limited to barcode (e.g., UPC, EAN, GTIN12, GTIN 13, or the like) readers, quick response (QR) code readers, radio frequency identification (RFID) readers, stock keeping unit (SKU) readers, near field communication (NFC) readers, video capture-enabled devices (e.g., cameras, smartwatches, glasses, or the like) electronic tablets, cellular phones, or the like mobile electronic devices. Alternatively, the scanning device 130 may be a stationary electronic scanning device installed in the product receiving area 150, stock room 160, or on the sales floor 180 of the retail sales facility 110. In the embodiment illustrated in FIG. 1, the scanning device 130 may obtain electronic data associated with the scanned product 190 by communicating via a communication channel 135 (e.g., radio waves) with a unique identifying indicia 192 (e.g., barcode, RFID, SKU, or the like) on an exterior of the product 190.

Figure 2:
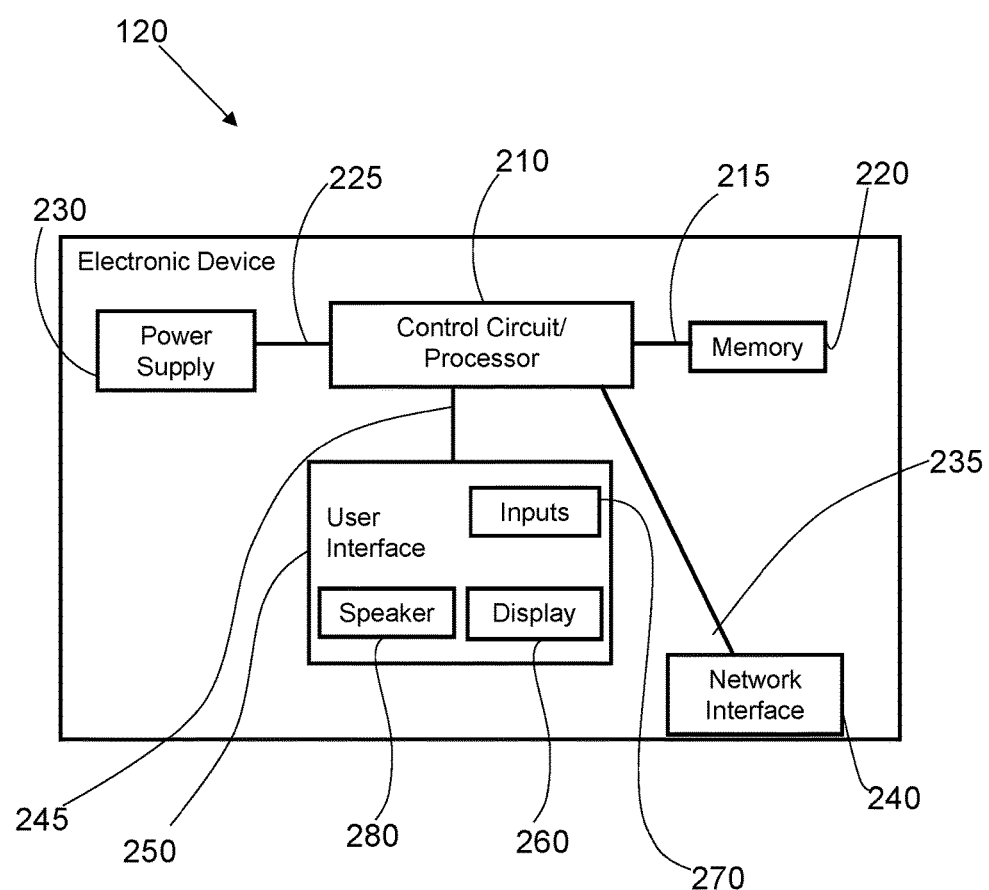
FIG. 2 is a functional block diagram of an electronic inventory management device in accordance with some embodiments.

An exemplary electronic inventory management device 120 depicted in FIG. 2 is a computer-based device and includes a control circuit (i.e., control unit) 210 including a processor (for example, a microprocessor or a microcontroller) electrically coupled via a connection 215 to a memory 220 and via a connection 225 to a power supply 230. The control unit 210 can comprise a fixed-purpose hard-wired platform or can comprise a partially or wholly programmable platform, an application specification integrated circuit, a field programmable gate array, and so on. These architectural options are well known and understood in the art and require no further description.

This control unit 210 can be configured (for example, by using corresponding programming stored in the memory 220 as will be well understood by those skilled in the art) to carry out one or more of the steps, actions, and/or functions described herein. In some embodiments, the memory 220 may be integral to the processor-based control unit 210 or can be physically discrete (in whole or in part) from the control circuit (i.e., control unit) 210 and is configured non-transitorily store the computer instructions that, when executed by the control unit 210, cause the control unit 210 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory 220 and/or the control unit 210 may be referred to as a non-transitory medium or non-transitory computer readable medium.

In the embodiment illustrated in FIG. 2, the control unit 210 is also electrically coupled via a connection 235 to a network interface 240 that can receive signals from and transmit signals such as commands, inventory database information, and other electronic data via a wireless or wired connection to electronic devices local to the retail sales facility 110, or one or more servers remote to the retail sales facility 110. The network may be a wide-area network (WAN), a local area network (LAN), a personal area network (PAN) or any other sized network. The network may enable one or more electronic devices to communicate via the Internet and may include cloud-based features, such as cloud-based memory storage. The communications over the network may take place over hard-wired, cellular, Wi-Fi or Bluetooth networked components or the like.

Optionally, instead of receiving information associated with the products 190 located in the product receiving area 150, and/or stock room 160, and/or sales floor 180 of the retail sales facility 110 from a separate scanner such as the scanning device 130, the control unit 210 of the electronic inventory management device 120 may be electrically coupled to a sensor such as a reader configured to detect and/or read information on the identifying indicia 192 located on a product 190 when the electronic inventory management device 120 is placed in direct proximity to the product 190 to enable the scanning of the identifying indicia 192. Such an optional reader may include, but is not limited to an RFID reader, optical reader, barcode reader, or the like.

In the embodiment shown in FIG. 2, the processor-based control unit 210 of the electronic inventory management device 120 is electrically coupled via a connection 245 to a user interface 250, which may include a visual display or display screen 260 (e.g., LED screen) and/or button input 270 that provide the user interface 250 with the ability to permit a user such as a product unloading worker, or stock room associate, or sales floor associate at the retail sales facility 110 to manually control the electronic inventory management device 120 by inputting commands, for example, via touch-screen and/or button operation or voice. The display screen 260 can also permit the user to see menus, options, worker tasks, and/or alerts displayed by the electronic inventory management device 120. The user interface 250 of the electronic inventory management device 120 may also include a speaker 280 that provides audible feedback (e.g., alerts) to the user.

Figure 3:
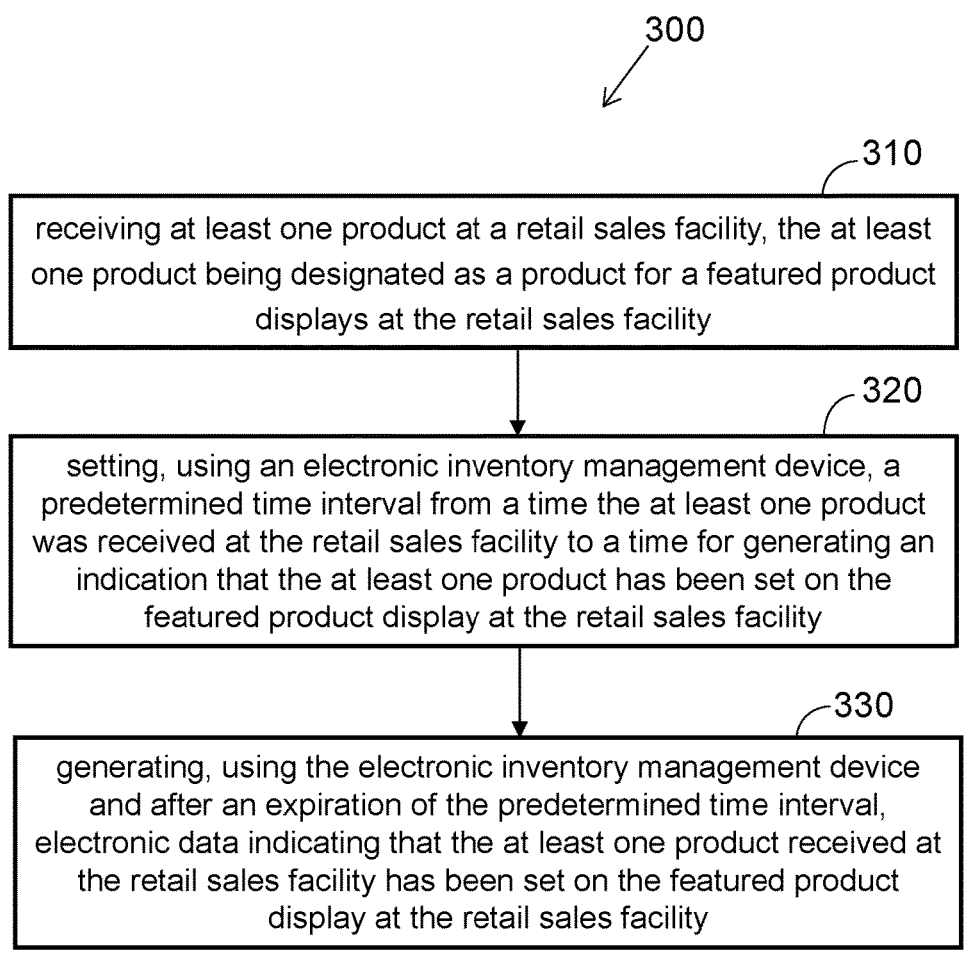
FIG. 3 is a flow diagram of a process of monitoring feature product inventory at a retail sales facility in accordance with some embodiments.

With reference to FIGS. 1-3, one method 300 of operation of the system 100 for monitoring featured product displays 170 at a retail sales facility 110 will now be described. The method 300 is described in the context of the system of FIG. 1 by way of example only. It will be appreciated that embodiments of the method 300 may be implemented not only in the system 100, but in other systems.

As shown in FIG. 3, the method 300 includes receiving one or more products 190 at the retail sales facility 110 that are designated as featured products to be displayed on one or more featured product displays 170 at the retail sales facility 110 (step 310). In some embodiments, such products 190 may include a unique visual identifier or identifying indicia 192 on an exterior of the product 190 that indicates (e.g., to a worker at the retail sales facility 110) that the product 190 is designated as a featured product and is to be set on a featured product display 170. The identifying indicia 192 that reveals that the product 190 is designated as a featured product may be an identifier that requires a scan by the scanning device 130 at the retail sales facility 110, e.g., a passive identifier such as a quick response (QR) code, bar code (e.g., UPC, GTIN12, EAN, GTIN13, or the like), passive RFID tag, or the like, or may be an active identifier such as an NFC tag, active RFID tag, or the like.

In some embodiments, the unique identifying indicia 192 indicating that a product 190 is designated as a featured product to be set on a featured product display 170 may be an identifier that does not require scanning by the scanning device 130, but which is visible to the worker without the use of an electronic device, and which visually indicates to the worker that the product 190 is a featured product that is to be set on a featured product display 170. Such a visual identifier may be a sticker, a label, a print, or the like on an exterior packaging of the product 190.

In some embodiments, after a product 190 is delivered to the retail sales facility 110 on a delivery truck, one or more workers (i.e., unloading crew members) open the doors to the cargo space of the delivery truck in order to access and unload the product 190 from the cargo space, and indicate receipt of the product 190 at the retail sales facility 110 by inputting electronic data into the scanning device 130. In one approach, when a worker unloads a product 190 from a delivery truck in the product receiving area 150 of the retail sales facility 110, the worker may use the scanning device 130 to individually scan each product 190 as the product 190 is being unloaded. In response to the scan, electronic data uniquely identifying the scanned product 190 and a time stamp of receipt of the scanned product 190 may be transmitted from the scanning device 130 to the electronic inventory management device 120 via the two-way communication channel 125 and may be stored in the inventory management database 140.

In another approach, when a worker unloads a product 190 from a delivery truck in the product receiving area 150 of the retail sales facility 110, the worker may use the scanning device 130 to scan an electronic bill of lading for all of the products 190 on the delivery truck. In response to this scan, electronic data uniquely identifying the products 190 listed on the electronic bill of lading for the delivery truck may be obtained by the scanning device 130 and transmitted to the electronic inventory management device 120 for storage in the inventory management database 140. In yet another approach, as the worker is initiating the unload of the products 190 from the delivery truck, the worker may manually enter electronic data identifying the worker task performed by the worker (i.e., product receiving/unloading) with respect to the products 190 on the delivery truck. This electronic data representing the worker task that is entered by the worker may be transmitted by the scanning device 130 to the electronic inventory management device 120 and recorded in the inventory management database 140.

Since the inventory management database 140 stores electronic data associated with each of the products 190 received at the retail sales facility 110, for example, electronic data uniquely identifying each of the received products 190 and the time stamp of receipt at the retail sales facility 110, the control unit 210 is programmed to process such electronic information stored in the inventory management database 140 to obtain additional electronic information associated with the products 190. Such additional electronic information associated with a product 190 may include, for example, an indication of whether the product 190 is a featured product or a regular replenishment product, an indication of a scheduled start date of a featured product display 170 associated with the product 190, and an indication of whether the product 190 is to be set on the featured product display 170 by itself without any other related featured products 190, or if the product 190 is to be set on the featured product display 170 together with one or more related feature products 190. As described in more detail below, based at least on such information associated with the products 190 retrieved from the inventory management database 140, the control unit 210 is programmed to determine a period of delay for updating the inventory management database 140 with an indication that a featured product 190 has been set on the featured product display 170.

In the embodiment of FIG. 3, the control unit 210 of the electronic inventory management device 120 is programmed to set a predetermined time interval from a time one or more products 190 designated as featured products for featured product display 170 are received at the retail sales facility 110 to a time for generating an indication (e.g., in the inventory management database 140) that the products 190 have been set on their respective featured product display 170 at the retail sales facility 110 (step 320). The delay period from the time the products 190 are actually received at the retail sales facility 110 to the time when the inventory management database 140 is updated to indicate that the products 190 have been set on their respective featured product display 170 on the sales floor 180 of the retail sales facility 110 may depend on a variety of factors processed by the control unit 210 of the electronic inventory management device 120.

In one approach, the control unit 210 may be programmed to set the period of delay for updating the inventory management database 140 based on when a featured product 190 was received at the retail sales facility 110 and the time when the product 190 is placed into a bin 165 (i.e., "binned") in the stock room 160 and/or is picked from the bin 165 in the stock room 160. In another approach, the control unit 210 may be programmed to set the period of delay for updating the inventory management database 140 based on when a featured product 190 was received at the retail sales facility 110 and the time when the period of displaying the featured product 190 on the featured product display 170 is scheduled to start. An exemplary delay period that may be set by the control unit 210 of the electronic inventory management device 120 may be from about 4 hours to about 48 hours from receipt of the product 190 at the retail sales facility. In some embodiments, the delay period may be, for example, 6 hours, 8 hours, 12 hours, 24 hours, or 36 hours.

For example, in some embodiments, after receiving electronic data (e.g., from the scanning device 130) indicating that the doors of the cargo space of the delivery truck containing a product 190 having a feature designation are opened (i.e., an indication that unloading of products 190 has been initiated), the control unit 210 of the electronic inventory management device 120 is programmed to set a delay period for updating the inventory management database 140 to indicate that the feature product 190 delivered to the retail sales facility 110 has been set on the featured product display 170 on the sales floor 180 of the retail sales facility 110. The control unit 210 of the electronic inventory management device 120 may be programmed to analyze several factors in determining how long the delay period for updating the inventory management database 140 should be. In some approaches, the control unit 210 may be programmed to analyze historical data indicating an average time from the unloading of products 190 from a delivery truck at the retail sales facility 110 to the binning of the products 190 in bins 165 in the stock room 160 and/or to the setting of the products 190 on the featured product displays 170.

In one approach, the control unit 210 may be programmed to analyze electronic data associated with the featured product 190 and indicating when the feature period for the featured product 190 is scheduled to start relative to the time of unloading of the product 190 from a delivery truck at the retail sales facility 110. In another approach, the control unit 210 may be programmed to analyze electronic data associated with the featured product 190 and indicating whether the featured product 190 is to be set on a featured product display 170 alone or with one or more related products 190 and, if the featured product 190 is to be set on the featured product display 170 with one or more related products 190, to analyze electronic data indicating whether the one or more related products 190 all have been received at the retail sales facility 110. Based on an analysis of at least such electronic information, which may be retrieved by the control unit 210 from the inventory management database 140 as described below, the control unit 210 is programmed to set a period of delay for updating the inventory management database 140 to indicate that the product 190 delivered to the retail sales facility 110 has been set on the featured product display 170 on the sales floor 180 of the retail sales facility 110.

For example, in some embodiments, the processor of the control unit 210 of the electronic inventory management device 120 is programmed to query the inventory management database 140 to determine whether electronic data indicating user confirmation of a task performed with respect to a featured product 190 is physically entered by the worker using the scanning device 130. In one approach, if the electronic data retrieved from the inventory management database 140 in response to such a query indicates that the worker task of, for example, unloading of a delivered featured product 190, was physically entered by the worker using the scanning device 130, the control unit 210 is programmed to send a signal to the inventory management database 140 to set a predetermined time interval from a time the featured product 190 was received at the retail sales facility 110 to a time for generating an indication that the featured product 190 has been set on the featured product display 170 at the retail sales facility 110.

In another approach, if the electronic data retrieved from the inventory management database 140 in response to such a query indicates that the worker task of, for example, placing a featured product 190 into a bin 165 was physically entered by the worker using the scanning device 130 during such a predetermined time interval, the control unit 210 is programmed to send a signal to the inventory management database 140 indicating that the featured product 190 has not been set on the featured product display 170 at the retail sales facility 110. Conversely, if the electronic data retrieved from the inventory management database 140 in response to such a query indicates that the worker task of placing the featured product 190 into the bin 165 was not physically entered by the worker using the scanning device 130 during the predetermined time interval, the control unit 210 is programmed to send a signal to the inventory management database 140 indicating that the featured product 190 has been set on the featured product display 170 at the retail sales facility 110.

In the embodiment of FIG. 3, the control unit 210 of the electronic inventory management device 120 is programmed to generate, after the expiration of the predetermined time interval of delay set by the control unit 210, electronic data indicating that one or more products 190 received at the retail sales facility 110 and designated as featured products 190 for featured product displays 170 have been set on the featured product display 170 at the retail sales facility 110 (step 330). Such electronic data, after being generated by the control unit 210 upon the expiration of the predetermined delay period may be stored in the inventory management database 140, indicating that the featured products delivered to the retail sales facility 110 have been set on their intended featured products displays 170, without requiring the workers to manually scan each of the featured products 190 when setting the featured products 190 on the featured product displays 170. This advantageously provides a significant time savings for the workers and reduces the chances for human error that are often associated with numerous manual scans by the workers.

In some embodiments, the control unit 210 of the electronic inventory management device 120 is programmed to generate electronic data indicating that a featured product 190 has been set on the featured product display 170 at the retail sales facility 110 in response to the electronic inventory management device 120 not receiving, during the predetermined time interval set by the control unit 210, electronic data indicating that the featured product 190 delivered to the retail sales facility 110 has been placed into a bin 165 in a stock room 160. This may occur, for example, when the featured product display 170 includes units of only one product 190 and the product 190, after being delivered to the retail sales facility 110, has not been binned within the delay period predetermined by the control unit 210 for delaying the updating of the inventory management database 140 to indicate that the featured product 190 has been set on the featured product display 170 on the sales floor 180 of the retail sales facility 110.

In some embodiments, a featured product display 170 may include multiple products 190 that are related such that they may be often purchased together by a consumer, for example, sweet potatoes, marshmallows, and brown sugar for a Thanksgiving-related featured product display 170. In such embodiments, the inventory management database 140 may contain electronic data indicating the association of these products 190 with each other and/or with a specific featured product display 170, providing an indication to a worker receiving only one or only two of these three featured products 190 that one or two more featured products 190 required to be displayed on the featured product display 170 to make the featured product display 170 complete has not been received yet at the retail sales facility 110. In such a situation, the worker may place one or two of the three featured products 190 in a bin 165 in the stock room 160 until a time when the second and/or third product 190 that completes the featured product display 170 is received at the retail sales facility. It will be appreciated that in some embodiments, the products 190 that are designated to share a featured product display 170 may all have an identical identifying indicia 192 in the form of a label, sticker, RFID, or barcode.

As discussed above, the electronic data stored in the inventory management database 140 indicates to workers at the retail sales facility 110 not only that a certain product 190 at the retail sales facility 110 is a featured product 190 that is to be set on a featured product display 170, but also when the start date of the featured product display 170 is, as well as whether additional products 190 are expected to be set on the featured product display 170 together with this product 190, and if such additional products 190 have been received at the retail sales facility 110. Such electronic data enables the control unit 210 to set an appropriate period of delay for updating the inventory management database 140. For example, if three featured products 190 are all received at the retail sales facility 110 on a given day and designated to be set together on one featured product display 170 two days later on their specified featured product display start date, the control unit 210 of the electronic inventory management device 120 may be programmed to set a delay of 48 hours for updating the inventory management database 140 to indicate that the products 190 have been set on the featured product display 170.

During this 48 hour predetermined time interval of delay set by the control unit 210, if electronic data indicating that all three of the binned featured products 190 were picked from the bin 165 in the stock room 160 at the retail sales facility 110, the control unit 210 of the electronic inventory management device 120 may be programmed to generate electronic data indicating that the products 190 have been set on the featured product display 170 at the retail sales facility 110. Conversely, in response to receiving, during the predetermined 48-hour time interval, electronic data indicating that only one or only two of the three binned featured products 190 were picked from the bin 165 in the stock room 160 at the retail sales facility 110 (and either one or two of the remaining featured products 190 have not been picked from a bin 165 or not yet delivered to the retail sales facility 110), the control unit 210 of the electronic inventory management device 120 may be programmed to generate electronic data indicating that the products 190 have not been set on the featured product display 170 at the retail sales facility 110. Thus, the control unit 210 may be programmed to assume that after all of the featured products 190 necessary to complete a particular featured product display 170 have been received at the retail sales facility 110 and placed into a bin 165 in the stock room 160, in order to set such products 190 onto the featured product display 170, the worker would have to pick all of the products associated with that featured product display 170, and not just pick some of the products 190 from the bin 165 individually.

In some embodiments, the control unit 210 of the electronic inventory management device 120 may be programmed to generate electronic data indicating that the products 190 have been set on the featured product display 170 based on a quantity of units of the first, second, or third featured product 190 picked from the bin 165. In other words, in the situation described above, where the featured product display 170 is to have three featured products 190, if a worker picks a number of units of one or two of the three featured products 190 determined by the control unit 210 to be sufficient to properly set the featured product display 170, the control unit 210 would generate electronic data indicating that the featured products 190 have been set on the featured product display 170 despite the fact that the third one of the featured products 190 was not picked from the bin 165 or has not yet been delivered to the retail sales facility 110. Thus, the control unit 210 may be programmed to determine a quantity of units of the featured products 190 that is sufficient to properly set the featured product display 170.

In some embodiments, the control unit 210 of the electronic inventory management device 120 is programmed to generate a non-compliance alert based on certain action or inaction by a worker at the retail sales facility 110. Such non-compliance alerts may enable the inventory management database 140 to track the work quality by the workers at the retail sales facility 110, thereby providing metrics and trends that may be used by supervisory personnel at the retail sales facility 110 to improve the quality of the work product of the workers (e.g., stock room associates). In some embodiments, a non-compliance alert may be transmitted from the electronic inventory management device 120 to a scanning device 130 of a worker as electronic data configured to generate an audible alert (e.g., a beep) or a visual alert (on-screen message) on the scanning device 130, prompting the worker to take appropriate action in response to the alert of non-compliance.

In some embodiments, for products 190 received at the retail sales facility 110 and indicated (e.g., via unique identifying indicia 192 such as a bar code, RFID, peel-on label, or an imprint on the product 190) to be featured products 190, the control unit 210 is programmed to set a delay for updating the inventory management database 140 to indicate that such products 190 were set on the featured product display 170 from a time of receipt of an indication that the products 190 were received at the retail sales facility 110 to a time of when the products 190 would be estimated by the control unit 210 to be either set on the featured product display 170 or placed into a bin 165 in the stock room 160 at the retail sales facility 110. Then, in response to the detecting of a binning of a "featured" product 190 as discussed above, which may be electronic data representing a scan of the featured product 190 transmitted from the scanning device 130 during the binning of the product 190, the control unit 210 is programmed to generate a non-compliance alert and transmit this alert to the scanning device 130 of the worker to prompt the worker to correct this action by removing the improperly binned product from the bin 165 in the stock room 160 and bringing the product 190 to the sales floor 180 to be set on the featured product display 170.

Conversely, in response to not receiving electronic data indicating the worker task of binning of the product 190 in the stock room 160 throughout the duration of the set predetermined period of time of delay, the control unit 210 of the electronic inventory management device is programmed to send a signal to the inventory management database 140 to update by indicating that the product 190 was set on the featured product display 170. In one approach, the control unit 210 of the electronic inventory management device 120 may be programmed to generate a non-compliance alert and transmit this alert to the scanning device 130 of the worker in response to detecting of the setting of a featured product 190 on the featured product display 170 prior to the scheduled start date of the featured product display 170. In other words, if the scheduled start date of a featured product display 170 is February 14 and the control unit 210 receives an indication that a worker set the featured products 190 on the featured product display 170 on February 12, the control unit 210 may be programmed to transmit a non-compliance alert to the scanning device 130 of the worker, prompting the worker to take corrective action by removing the prematurely set featured products 190 from the featured product display 170.

The systems and methods described herein analyze one or more factors associated with a product designated to be displayed on a feature product display to determine an appropriate period of delay for updating the inventory management system to indicate that the product has been set on the feature product display. The appropriate delay and subsequent updating of the inventory management database to indicate that the featured products have been set on the featured product display without requiring the workers at the retail sales facility to manually scan each product after the featured product delivered to the retail sales facility is set on the featured product display advantageously increases the accuracy of the inventory management system with respect to indicating the on-hand inventory of featured products at the retail sales facility and significantly improves worker efficiency. Specifically, the methods and systems described herein significantly reduce the inventory management system errors typically associated with a large number of manual product scans and the workers are enabled to perform various other tasks instead of manually scanning each featured product being set on the featured product display.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A method of monitoring featured product displays at retail sales facilities, the method comprising:
    providing an inventory management database configured to store electronic information associated with products located at the retail sales facilities and electronic information associated with worker tasks performed by workers at the retail sales facilities in association with the products;
    providing visible and scannable identifying indicia on at least one product, the identifying indicia provided on the at least one product including an encoded identifier that, when scanned, indicates that the at least one product is a featured product to be set on the featured product display at a retail sales facility and is associated with at least one different featured product to be set on the featured product display together with the at least one product, the identifying indicia having the encoded identifier provided on the at least one product including at least one of barcode data, image recognition data, and radio frequency identification (RFID) data;
    scanning, via an electronic hand-held device, the at least one product including the identifying indicia having the encoded identifier provided on the at least one product at the retail sales facility to acquire the encoded identifier of the at least one product;
    decoding, via the electronic hand-held device, the acquired encoded identifier of the scanned identifying indicia provided on the scanned at least one product;
    determining, by the electronic hand-held device and based on the decoding of the encoded identifier provided on the scanned at least one product, that the encoded identifier present on the scanned at least one product indicates that the scanned at least one product is designated as a featured product to be set on the featured product display at the retail sales facility and is associated with the at least one different featured product to be set on the featured product display together with the at least one product;
    designating, via sending a signal from the electronic hand-held device to the inventory management database, the at least one product scanned via the electronic hand-held device as a product for a featured product display at the retail sales facility;
    receiving, at the electronic inventory management device and from the electronic hand-held device, electronic data indicating that the at least one product has been received at the retail sales facility, the electronic data indicating at least one of:
        a time stamp indicating a time when the at least one product was scanned by the electronic hand-held device;
        that the at least one product received at the retail sales facility has been placed into a stockroom bin at the retail sales facility; and
        that the at least one product received at the retail sales facility has been picked from the stock room bin at the retail sales facility;
    obtaining, from the inventory management database and via an electronic inventory management device, electronic database data associated with the at least one product scanned by the electronic hand-held device;
    analyzing the electronic database data obtained from the inventory management database via the electronic inventory management device to determine a time interval from a time the at least one product was scanned via the electronic hand-held device at the retail sales facility to the time for generating in the inventory management database other electronic database data indicating that the at least one product scanned via the electronic hand-held device has been set on the featured product display at the retail sales facility;
    setting, via the electronic inventory management device and based on the analyzing step, a predetermined time interval from the time the at least one product was scanned via the electronic hand-held device at the retail sales facility to the time for generating in the inventory management database other electronic database data indicating that the at least one product scanned via the electronic hand-held device has been set on the featured product display at the retail sales facility; and
    generating, using the electronic inventory management device and after an expiration of the predetermined time interval, other electronic database data in the inventory management database indicating that the at least one product received at the retail sales facility has been set on the featured product display at the retail sales facility;
    wherein the generating step further comprising generating other electronic database data in the inventory management database indicating that the at least one product has been set on the featured product display at the retail sales facility in response to the electronic inventory management device not receiving from the electronic hand-held device, during the predetermined time interval, other electronic database data indicating that the at least one product received at the retail sales facility has been placed into the stock room bin at the retail sales facility.

2. The method of claim 1, wherein the electronic inventory management device is at a location remote to the retail sales location and is configured to receive, from the electronic hand-held device, other electronic database data indicating that the at least one product received at the retail sales facility has been designated via the electronic hand-held device for the featured product display.

3. A system for monitoring featured product displays at retail sales facilities, the system comprising:
    an inventory management database configured to store electronic information associated with products located at the retail sales facilities and electronic information associated with worker tasks performed by workers at the retail sales facilities in associated with the products;

at least one product including visible and scannable identifying indicia present thereon, the identifying indicia present on the at least one product including an encoded identifier that, when scanned, indicates that the at least one product is a featured product to be set on the featured product display at a retail sales facility and is associated with at least one different featured product to be set on the featured product display together with the at least one product, the identifying indicia having the encoded identifier present on the at least one product including at least one of barcode data, image recognition data, and radio frequency identification (RFID) data;

an electronic hand-held device configured to:
  scan the at least one product including the identifying indicia having the encoded identifier present on the at least one scanned product at the retail sales facility to acquire the encoded identifier of the scanned at least one product;
  decode the acquired encoded identifier of the scanned identifying indicia provided on the scanned at least one product;
  determine, based on decoding of the encoded identifier provided on the scanned at least one product, that the encoded identifier present on the scanned at least one product indicates that the scanned at least one product is featured product designated to be set on the featured product display at the retail sales facility and is associated with the at least one different featured product to be set on the featured product display together with the at least one product; and
  send to the inventory management database a signal that designates the scanned at least one product as a product for a featured product display at the retail sales facility;

an electronic inventory management device including a processor-based control unit, the control unit configured to:
  receive electronic data from the electronic hand-held device indicating that the at least one product has been received at the retail s ales facility, the electronic data indicating one of:
    a time stamp indicating a time when the at least one product was scanned by the electronic hand-held device;
    that the at least one product received at the retail sales facility has been placed into a stock room bin at the retail sales facility; and
    that the at least one product received at the retail sales facility has been picked from the stock room bin at the retail sales facility;
  obtain, from the inventory management database, electronic database data associated with the at least one product scanned by the electronic hand-held device;
  analyze the electronic database data obtained from the inventory management database to determine a time interval from a time the at least one product was scanned via the electronic hand-held device at the retail sales facility to a time for generating in the inventory management database other electronic database data indicating that the at least one product scanned via the electronic hand-held device has been set on the featured product display at the retail sales facility;
  set, based on analysis of the electronic database data obtained from the inventory management database, a predetermined time interval from the time of receipt of the at least one product at the retail sales facility to the time for generating in the inventory management database other electronic database data indicating that the at least one product scanned via the electronic hand-held device has been set on the featured product display at the retail sales facility;
  generate, after an expiration of the pre-determined time interval, other electronic database data in the inventory management database indicating that the at least one product received at the retail sales facility has been set on the featured product display at the retail sales facility; and
  generate in the inventory management database other electronic database data indicating that the at least one product has been set on the featured product display at the retail sales facility in response to the electronic management device not receiving from the electronic hand-held device, during the predetermined time interval, other electronic database data indicating that the at least one product received at the retail sales facility has been placed into the stock room bin at the retail sales facility.

4. The system of claim 3, wherein the control unit is further configured to generate other electronic database data in the inventory management database indicating that the at least one product has been set on the featured product display at the retail sales facility in response to the electronic inventory management device receiving from the electronic hand-held device, during the predetermined time interval, other electronic database data indicating that the at least one product received at the retail sales facility has been picked from the stock room bin at the retail sales facility.

5. The system of claim 3, wherein the control unit is further configured to generate an electronic non-compliance alert in response to receiving from the electronic hand-held device, during the predetermined time interval, other electronic database data indicating that the at least one product received at the retail sales facility for the featured product display has been placed into a stock room bin at the retail sales facility.

6. The system of claim 5, wherein the control unit is further configured to transmit, in response to the generation of the electronic non-compliance alert, an electronic notification of non-compliance to the electronic hand-held device at the retail sales facility.

7. The system of claim 3, wherein the electronic inventory management device is at a location remote to the retail sales location and is configured to receive, from the electronic hand-held device, other electronic database data indicating that the at least one product received at the retail sales facility has been designated via the electronic hand-held device for the featured product display.

* * * * *

UNITED STATES PATENT AND TRADEMARK OFFICE
CERTIFICATE OF CORRECTION

PATENT NO. : 10,510,041 B2
APPLICATION NO. : 15/397918
DATED : December 17, 2019
INVENTOR(S) : Matthew A. Jones et al.

Page 1 of 1

It is certified that error appears in the above-identified patent and that said Letters Patent is hereby corrected as shown below:

In the Claims

Column 14, Line 8 In Claim 1, delete "stockroom" and insert -- stock room --, therefor.

Column 14, Line 67 In Claim 3, delete "associated" and insert -- association --, therefor.

Column 15, Line 41 In Claim 3, delete "s ales" and insert -- sales --, therefor.

Column 15, Line 24 In Claim 3, insert -- inventory -- between electronic and management in the last claim element.

Signed and Sealed this
Nineteenth Day of May, 2020

Andrei Iancu
*Director of the United States Patent and Trademark Office*